(12) United States Patent
Kowiel

(10) Patent No.: US 12,071,855 B2
(45) Date of Patent: Aug. 27, 2024

(54) CONDUIT BUSHING WITH CELLULAR MATERIAL

(71) Applicant: Pratt & Whitney Canada Corp., Longueuil (CA)

(72) Inventor: Krzysztof Kowiel, Rzeszow (PL)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/976,465

(22) Filed: Oct. 28, 2022

(65) Prior Publication Data
US 2024/0141802 A1 May 2, 2024

(51) Int. Cl.
| | | |
|---|---|---|
| *F01D 25/04* | (2006.01) | |
| *F01D 9/06* | (2006.01) | |
| *F01D 25/30* | (2006.01) | |
| *F16F 1/38* | (2006.01) | |

(52) U.S. Cl.
CPC .............. *F01D 25/04* (2013.01); *F01D 9/065* (2013.01); *F01D 25/30* (2013.01); *F16F 1/3835* (2013.01); *F16F 1/3842* (2013.01); *F05D 2230/642* (2013.01); *F05D 2250/40* (2013.01); *F05D 2260/31* (2013.01); *F05D 2260/96* (2013.01); *F16F 2224/0225* (2013.01)

(58) Field of Classification Search
CPC .......... F01D 9/065; F01D 25/04; F01D 25/30; F16F 1/3835; F16F 1/3842; F05D 2230/642; F05D 2250/40; F05D 2260/31; F05D 2260/96
See application file for complete search history.

(56) References Cited

U.S. PATENT DOCUMENTS

| | | | |
|---|---|---|---|
| 5,984,372 A | 11/1999 | Cwik | |
| 6,052,991 A | 4/2000 | Schneider | |
| 6,102,577 A | 8/2000 | Tremaine | |
| 6,902,204 B2 | 6/2005 | Atanasoski | |
| 9,823,143 B2 * | 11/2017 | Twelves, Jr. ........... | B33Y 80/00 |

(Continued)

FOREIGN PATENT DOCUMENTS

| | | | | |
|---|---|---|---|---|
| DE | 102010055382 B4 * | 12/2016 | ........... | F01D 17/105 |
| GB | 2074289 A * | 10/1981 | ............. | B64D 27/26 |

(Continued)

OTHER PUBLICATIONS

Google Image Search for "metal mesh bearing", https://www.google.com/search?q=metal+mesh+bearing&rlz=1C1CHBF_enUS946US946&sxsrf=ALiCzsYwi-uDMHTc4ZqYeYvyadj-g90DYw:1664424953241&source=lnms&tbm=isch&sa=X&ved=2ahUKEwifi9-Qkrn6AhVdFlkFHeUOCXAQ_AUoAXoECAEQAw&biw=1680&bih=907&dpr=1.

(Continued)

*Primary Examiner* — Topaz L. Elliott
(74) *Attorney, Agent, or Firm* — Getz Balich LLC

(57) ABSTRACT

An assembly is provided for a gas turbine engine. This engine assembly includes a gas turbine engine case, a conduit and a bushing. The gas turbine engine case includes a case wall and a boss at a port through the case wall. The conduit extends longitudinally along a centerline through the port and into an interior of the gas turbine engine case. The bushing circumscribes the conduit and is arranged within the port. The bushing is engaged with and laterally between the conduit and the boss. The bushing is configured from or otherwise includes a cellular material. The cellular material may be or otherwise include a cellular metal material and/or a cellular composite material.

17 Claims, 8 Drawing Sheets

(56) References Cited

U.S. PATENT DOCUMENTS

| | | | | |
|---|---|---|---|---|
| 10,563,538 B2* | 2/2020 | Birnkrant | | F01D 25/04 |
| 10,570,771 B2* | 2/2020 | Kollenrott | | F23R 3/60 |
| 11,156,129 B2* | 10/2021 | Sultana | | F01D 25/26 |
| 11,384,658 B1 | 7/2022 | Caulfeild | | |
| 11,415,015 B2* | 8/2022 | Fryer | | F01D 9/065 |
| 2010/0186943 A1* | 7/2010 | Sun | | F01D 25/18 |
| | | | | 165/51 |
| 2014/0070058 A1* | 3/2014 | Miller | | F01D 25/28 |
| | | | | 248/65 |
| 2015/0198084 A1* | 7/2015 | Daimer | | F16C 27/066 |
| | | | | 415/62 |
| 2015/0338005 A1* | 11/2015 | Davis | | F16L 21/02 |
| | | | | 285/305 |
| 2016/0245710 A1* | 8/2016 | Twelves, Jr. | | B33Y 80/00 |
| 2016/0251979 A1* | 9/2016 | Birnkrant | | F01D 5/16 |
| | | | | 60/725 |
| 2016/0363002 A1* | 12/2016 | Kollenrott | | F16L 3/1091 |
| 2017/0292449 A1* | 10/2017 | Agara | | F02C 7/06 |
| 2017/0292455 A1* | 10/2017 | VanTassel | | F01D 25/24 |
| 2018/0058404 A1* | 3/2018 | Tibbs | | F02M 61/167 |
| 2018/0119575 A1 | 5/2018 | Bouiller | | |
| 2018/0355762 A1* | 12/2018 | Tripodina | | F01D 11/24 |
| 2020/0256213 A1 | 8/2020 | Troughton | | |
| 2020/0291822 A1* | 9/2020 | Sultana | | F01D 25/28 |
| 2020/0325795 A1* | 10/2020 | Dube | | F16B 43/001 |
| 2021/0123356 A1* | 4/2021 | Fryer | | F01D 9/065 |

FOREIGN PATENT DOCUMENTS

| | | | |
|---|---|---|---|
| RU | 2206025 C1 * | 6/2003 | |
| RU | 72017 U1 * | 10/2007 | |

OTHER PUBLICATIONS

EP Search Report for EP Patent Application No. 23206771.0 dated Mar. 25, 2024.

* cited by examiner

CONDUIT BUSHING WITH CELLULAR MATERIAL

TECHNICAL FIELD

This disclosure relates generally to a gas turbine engine and, more particularly, to arranging a conduit with a stationary structure of the gas turbine engine.

BACKGROUND INFORMATION

A gas turbine engine may include an exhaust case and a fluid conduit which passes radially through a port in the exhaust case from an exterior of the exhaust case to an interior of the exhaust case. The fluid conduit may float within the port such that the exhaust case may thermally shift relative to the fluid conduit. While such an arrangement has various benefits, there is still room in the art for improvement. There is a need in the art, in particular, to support the fluid conduit proximate the exhaust case while still permitting thermally induced shifting between the exhaust case and the fluid conduit.

SUMMARY

According to an aspect of the present disclosure, an assembly is provided for a gas turbine engine. This engine assembly includes a gas turbine engine case, a conduit and a bushing. The gas turbine engine case includes a case wall and a boss at a port through the case wall. The conduit extends longitudinally along a centerline through the port and into an interior of the gas turbine engine case. The bushing circumscribes the conduit and is arranged within the port. The bushing is engaged with and laterally between the conduit and the boss. The bushing is configured from or otherwise includes a cellular material.

According to another aspect of the present disclosure, another assembly is provided for a gas turbine engine. This engine assembly includes a stationary structure, a fluid system and a bushing. The stationary structure includes a boss forming a port. The fluid system includes a fluid source and a fluid conduit configured to receive a fluid from the fluid source. The fluid conduit projects longitudinally along a centerline through the port. The fluid may be configured as or otherwise includes lubricant and/or coolant. The bushing is engaged with and laterally between the fluid conduit and the boss. The bushing is configured from or otherwise includes a cellular material.

According to still another aspect of the present disclosure, another assembly is provided for a gas turbine engine. This engine assembly includes a stationary structure, a conduit and a bushing. The stationary structure includes a boss. The boss forms a port and includes an annular shelf. The conduit extends longitudinally along a centerline through the port. The bushing is seated within the port and abutted longitudinally against the annular shelf. The bushing is engaged with and laterally between the conduit and the boss. The bushing includes a cellular material circumscribing the conduit.

The cellular material may be or otherwise include a cellular metal material.

The cellular material may be or otherwise include a cellular composite material.

The bushing may be configured to damp longitudinal vibrations of the conduit.

The bushing may be configured to damp lateral vibrations of the conduit.

The conduit may be configured to move longitudinally relative to the gas turbine engine case.

The conduit may be configured to move laterally relative to the gas turbine engine case.

The bushing may be configured to support the conduit within the boss.

The bushing may be fixed to the conduit.

The bushing may engage the conduit through a threaded connection.

The bushing may be fixed to the boss.

The assembly may also include a fastener extending through the boss and into the bushing. The fastener may mount the bushing to the boss.

The cellular material may be configured from or otherwise include metal mesh and/or composite mesh.

The cellular material may circumscribe the conduit.

The bushing may also include an inner wall circumscribing the conduit. The cellular material may also circumscribe and/or may be attached to the inner wall.

The bushing may also include an outer wall circumscribing and attached to the cellular material.

The bushing may be seated longitudinally against a shelf within the port.

The case wall may extend circumferentially about an axis. The axis may be angularly offset from the centerline.

The assembly may also include a sleeve mounted on the conduit. The bushing may engage the conduit through the sleeve.

The bushing may contact the conduit.

The gas turbine engine case may be configured as an exhaust case for the gas turbine engine.

The assembly may also include a gas turbine engine component within the gas turbine engine case. The conduit may be configured to supply fluid to the gas turbine engine component. The fluid may be or otherwise include lubricant and/or coolant.

The fluid may be or otherwise include a liquid and/or a gas.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
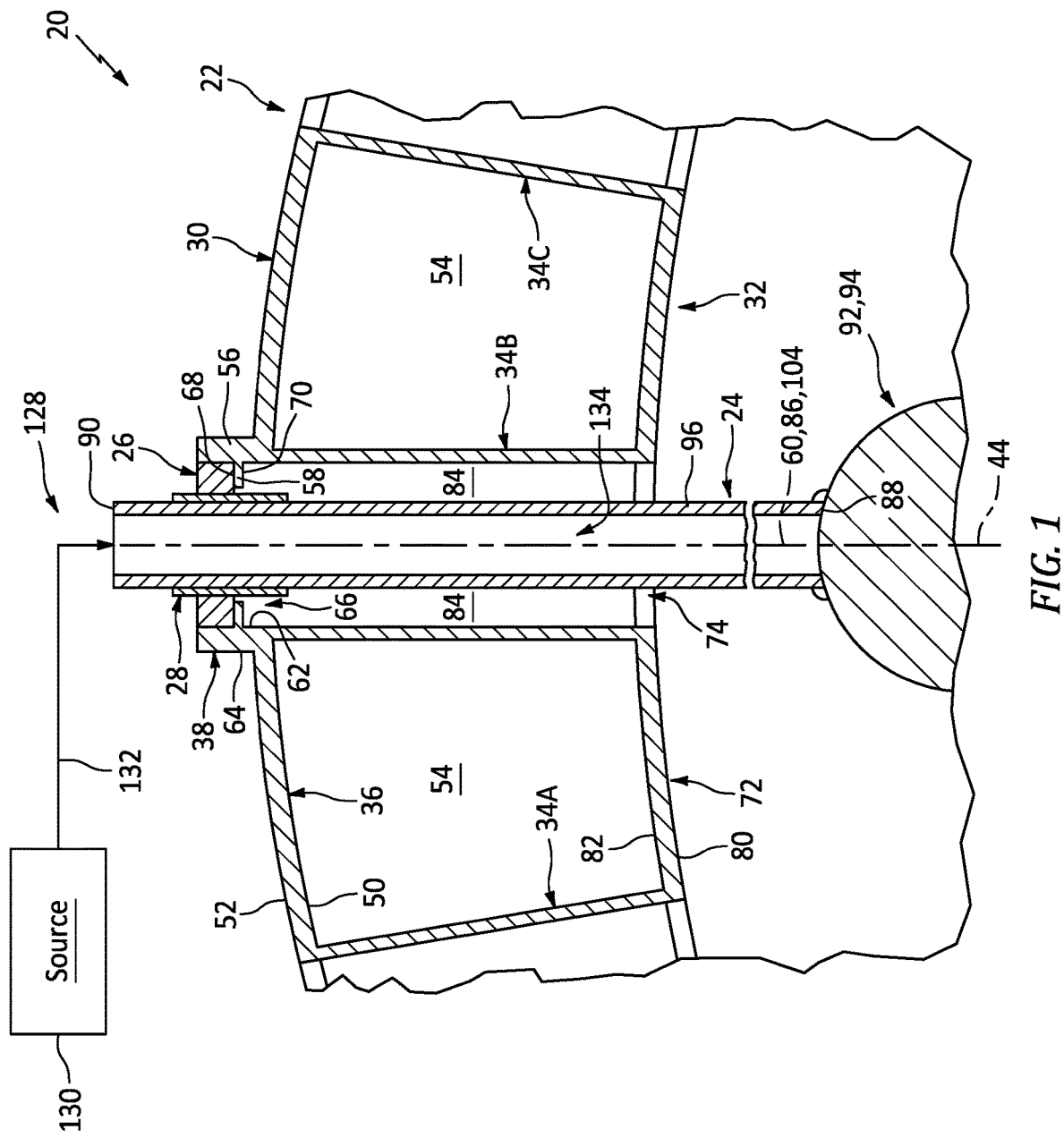
FIG. 1 is a partial cross-sectional illustration of an assembly for a gas turbine engine.

FIG. 1 illustrates an assembly 20 for a gas turbine engine. This engine assembly 20 includes a stationary structure 22, a fluid conduit 24 (e.g., a lubricant and/or coolant conduit) and a conduit bushing 26. The engine assembly 20 of FIG. 1 also includes a conduit sleeve 28 for the fluid conduit 24.

The stationary structure 22 may be any stationary (e.g., static) structure of the gas turbine engine. The stationary structure 22, for example, may be configured as or otherwise include a turbine exhaust case (TEC). In another example, the stationary structure 22 may be configured as or otherwise include a turbine support structure (e.g., a mid-turbine frame or case) or a compressor support structure (e.g., a mid-compressor frame or case). In still another example, the stationary structure 22 may be configured as a simple case or wall (e.g., an exhaust case) of the gas turbine engine through which the fluid conduit 24 may pass. The present disclosure, of course, is not limited to the foregoing exemplary stationary structure configurations. The stationary structure 22 of FIG. 1 includes an outer turbine engine case 30 ("outer case"), an inner turbine engine case 32 ("inner case") and one or more turbine engine struts (e.g., 34A-C; generally referred to as "34"); e.g., hollow frame struts.

Figure 2:
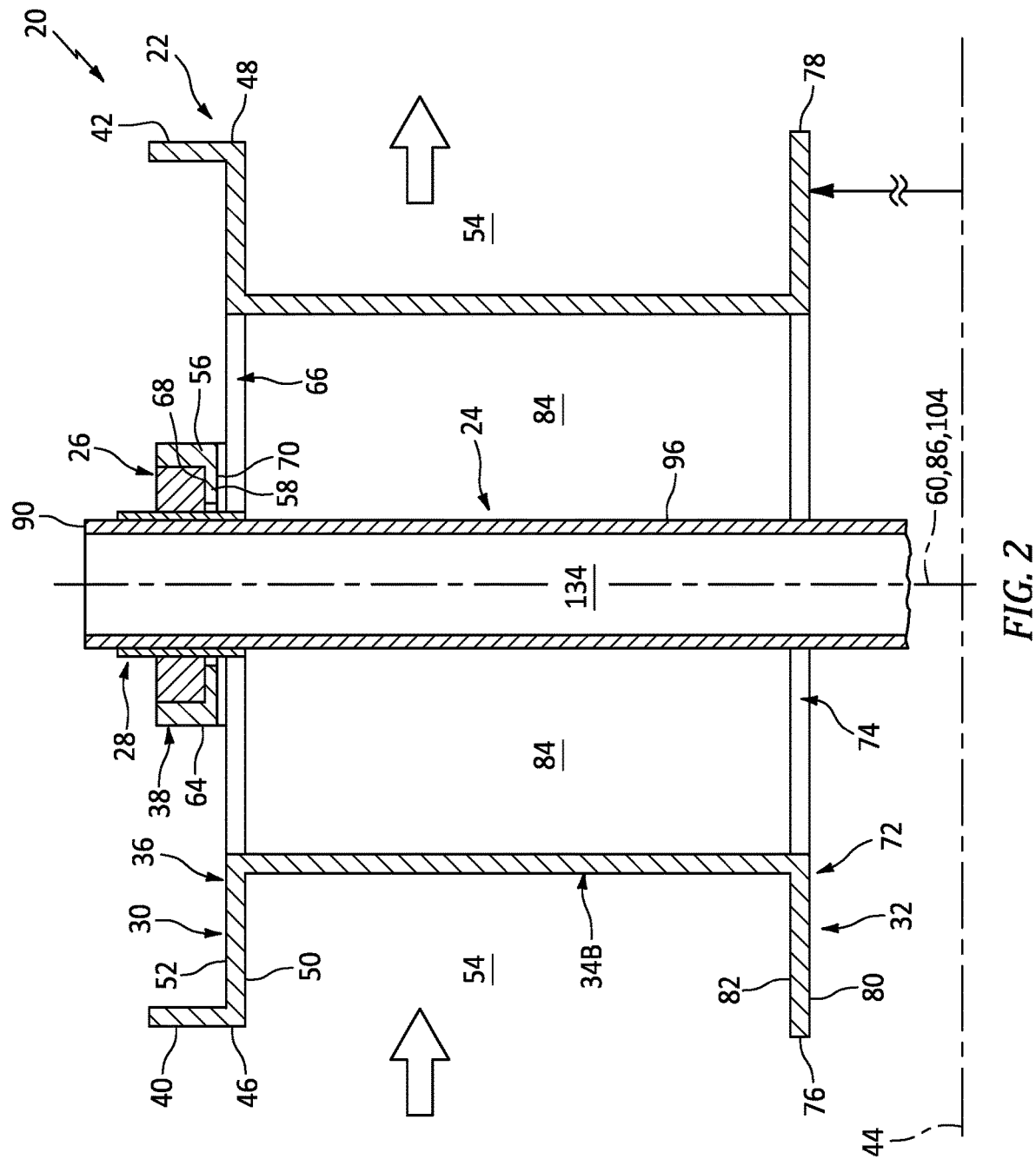
FIG. 2 is a partial side sectional illustration of the engine assembly of FIG. 1.

The outer case 30 of FIG. 1 includes an outer case wall 36 and an annular conduit boss 38. Referring to FIG. 2, the outer case 30 may also include one or more mounts 40 and 42; e.g., flanges or rims. The outer case 30 of FIGS. 1 and 2 may be configured as a turbine exhaust duct or case.

The outer case 30 of FIG. 1 and its outer case wall 36 extend circumferentially about (e.g., completely around) a centerline axis 44 of the stationary structure 22, which may provide the outer case 30 and its outer case wall 36 with a full-hoop (e.g., tubular) geometry. Briefly, the centerline axis 44 may also be a rotational axis for one or more rotors within the gas turbine engine. Referring to FIG. 2, the outer case 30 and its outer case wall 36 extend axially along the centerline axis 44 between and to a forward, upstream end 46 of the outer case wall 36 and an aft, downstream end 48 of the outer case wall 36. The outer case wall 36 extends radially between and to an inner side 50 of the outer case 30 and an outer side 52 of the outer case wall 36. The outer case inner side 50 of FIGS. 1 and 2 forms an outer peripheral boundary of a flowpath 54 through the stationary structure 22.

The conduit boss 38 is disposed at (e.g., on, adjacent or proximate) the outer case wall outer side 52. The conduit boss 38 of FIGS. 1 and 2, for example, is connected to (e.g., formed integral with or otherwise attached to) the outer case wall 36. This conduit boss 38 includes a boss wall 56 and a boss rim 58. The conduit boss 38 and its boss wall 56 project longitudinally along a longitudinal centerline 60 of the conduit boss 38 (e.g., radially relative to the centerline axis 44) out from the outer case wall outer side 52 to a distal end of the conduit boss 38. Briefly, this longitudinal centerline 60 may be angularly offset from (e.g., but, coincident with) the centerline axis 44; e.g., the longitudinal centerline 60 may be perpendicular to or acutely angled to the centerline axis 44. The conduit boss 38 and its members 56 and 58 extend circumferentially about (e.g., completely around) the longitudinal centerline 60, which may provide the conduit boss 38 and its members 56 and 58 with a full-hoop (e.g., tubular or annular) geometry. The boss wall 56 extends laterally (e.g., radially relative to the longitudinal centerline 60) between and to an inner side 62 of the boss wall 56 and an outer side 64 of the conduit boss 38. The boss wall inner side 62 at least partially or completely forms an outer peripheral boundary of an outer port 66 through the outer case 30 and its case members 36 and 38. More particularly, the outer port 66 extends longitudinally along the longitudinal centerline 60 through the outer case 30 and its case members 36 and 38 between and to the boss distal end and the outer case inner side 50. The boss rim 58 projects laterally (e.g., radially relative to the longitudinal centerline 60) inwards into the outer port 66 from the boss wall inner side 62. The boss rim 58 extends longitudinally along the longitudinal centerline 60 between and to an (e.g., annular) outer shelf 68 of the boss rim 58 and an (e.g., annular) inner shelf 70 of the boss rim 58. With this arrangement, the conduit boss 38 may be configured with one or more counterbores. The outer counterbore projects longitudinally along the longitudinal centerline 60 into the outer case wall 36 from the boss distal end to the internal boss outer shelf 68. The inner counterbore projects longitudinally along the longitudinal centerline 60 into the outer case wall 36 from the outer case wall inner side 50 to the internal boss inner shelf 70.

Figure 3B:
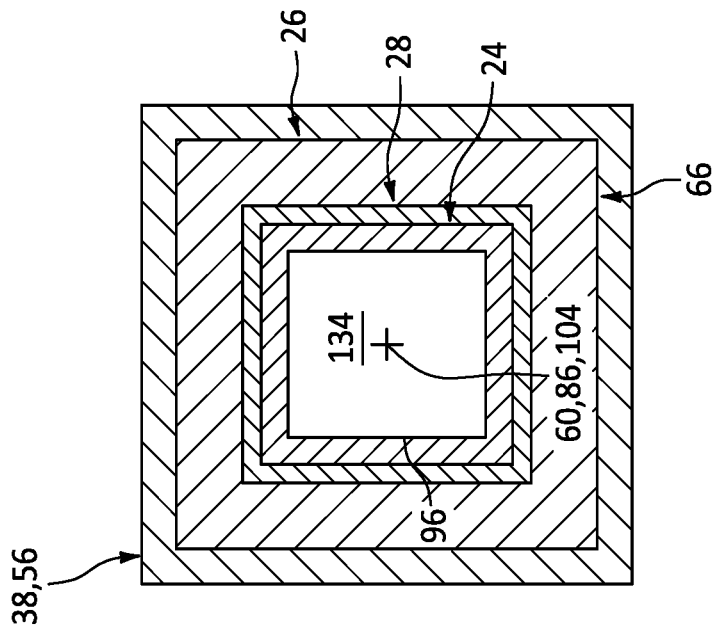
FIGS. 3A and 3B are cross-sectional illustrations of a fluid conduit with various geometries at an interface with a conduit bushing and a conduit boss.
Figure 3A:
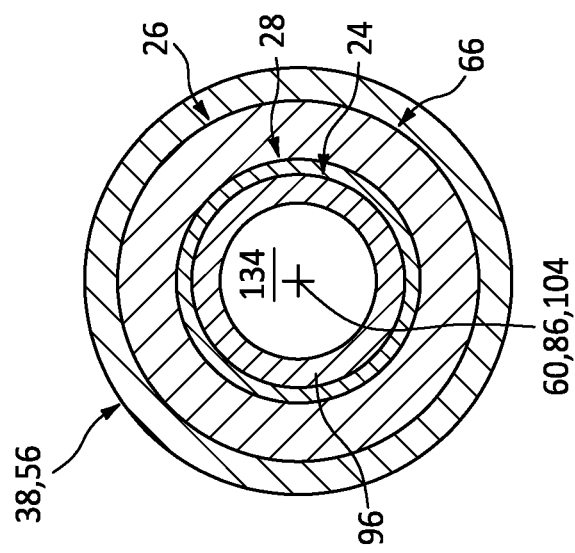

Referring to FIGS. 3A and 3B, the outer port 66 has a cross-sectional geometry when viewed in a reference plane, for example, perpendicular to the longitudinal centerline 60. Referring to FIG. 3A, the outer port geometry may be circular. Alternatively, referring to FIG. 3B, the outer port geometry may be non-circular; e.g., polygonal such as square, rectangular, etc.

Referring to FIG. 2, the forward, upstream mount 40 may be disposed at the outer case wall upstream end 46. The aft, downstream mount 42 may be disposed at the outer case wall downstream end 48. Each of these mounts 40, 42 is connected to the outer case wall 36. Each of the mounts 40, 42 may project radially (relative to the centerline axis 44) out from the outer case wall 36 to a respective distal end of the mount 40, 42. Each of these mounts 40, 42 may be configured to facilitate mounting the outer case 30 and, more generally, the stationary structure 22 to another respective component of the gas turbine engine. The present disclosure, however, is not limited to such an exemplary mounting arrangement.

The inner case 32 of FIG. 1 includes an inner case wall 72 with an inner port 74 through the inner case 32. The inner case 32 and its inner case wall 72 extend circumferentially about (e.g., completely around) the centerline axis 44, which may provide the inner case 32 and its inner case wall 72 with a full-hoop (e.g., tubular) geometry. Referring to FIG. 2, the inner case 32 and its inner case wall 72 extend axially along the centerline axis 44 between and to a forward, upstream end 76 of the inner case wall 72 and an aft, downstream end 78 of the inner case wall 72. The inner case wall 72 extends radially between and to an inner side 80 of the inner case wall 72 and an outer side 82 of the inner case 32. The inner case outer side 82 of FIGS. 1 and 2 forms an inner peripheral boundary of the flowpath 54 through the stationary structure 22. The inner port 74 projects longitudinally along the longitudinal centerline 60 through the inner case 32 and its inner case wall 72 between and to the inner case wall inner side 80 and the inner case outer side 82. A cross-sectional geometry of the inner port 74 may match (e.g., be the same as) or may be different than the outer port geometry.

The struts 34 of FIG. 1 are arranged circumferentially about the centerline axis 44 in a circular array. This array of the struts 34 is disposed radially between the outer case 30 and the inner case 32. Each of the struts 34 of FIG. 1 extends radially between and is connected to the outer case wall 36 and the inner case wall 72. Each of the struts 34 thereby extends radially across the flowpath 54 between the inner case 32 and the outer case 30. Each of the struts 34 of FIG. 1 is hollow. Each of the struts 34 of FIG. 1, for example, has a strut passage 84 (e.g., bore) which extends spanwise (e.g., longitudinally) through the respective struts 34. The struts passage 84 of a first of the struts 34B ("first strut") is (e.g., axially and/or circumferentially) aligned with the outer port 66 and the inner port 74. The first struts passage 84 is thereby radially between and fluidly coupled with (or forms) the outer port 66 and the inner port 74.

The fluid conduit 24 extends longitudinally along a longitudinal centerline 86 of the fluid conduit 24 between and to an inner end 88 of the fluid conduit 24 and an outer end 90 of the fluid conduit 24, which longitudinal centerline 86 may be coaxial with the longitudinal centerline 60. The conduit inner end 88 of FIG. 1 is connected to an inner component 92 of the gas turbine engine (schematically shown). The conduit inner end 88, for example, may be connected (e.g., welded, brazed and/or otherwise bonded) to and fluidly coupled with a bearing support structure 94. The fluid conduit 24 projects longitudinally along the longitudinal centerline 60, 86 out from its inner end 88, sequentially through the apertures 74, 84 and 66, to conduit outer end 90. The fluid conduit 24 may thereby pass (e.g., radially relative to the centerline axis 44) from an exterior of the stationary structure 22 into an interior of the stationary structure 22; thus, crossing the flowpath 54 without being exposed to/coming in contact with a fluid (e.g., relatively hot exhaust gas/combustion products) flowing through the flowpath 54.

Referring to FIGS. 3A and 3B, a tubular sidewall 96 of the fluid conduit 24 has a cross-sectional geometry when viewed in the reference plane. Referring to FIG. 3A, the fluid conduit geometry may be circular. Alternatively, referring to FIG. 3B, the fluid conduit geometry may be non-circular; e.g., polygonal such as square, rectangular, etc. The fluid conduit geometry may be match with (e.g., the same as) the outer port geometry and/or the inner port geometry.

Figure 4:
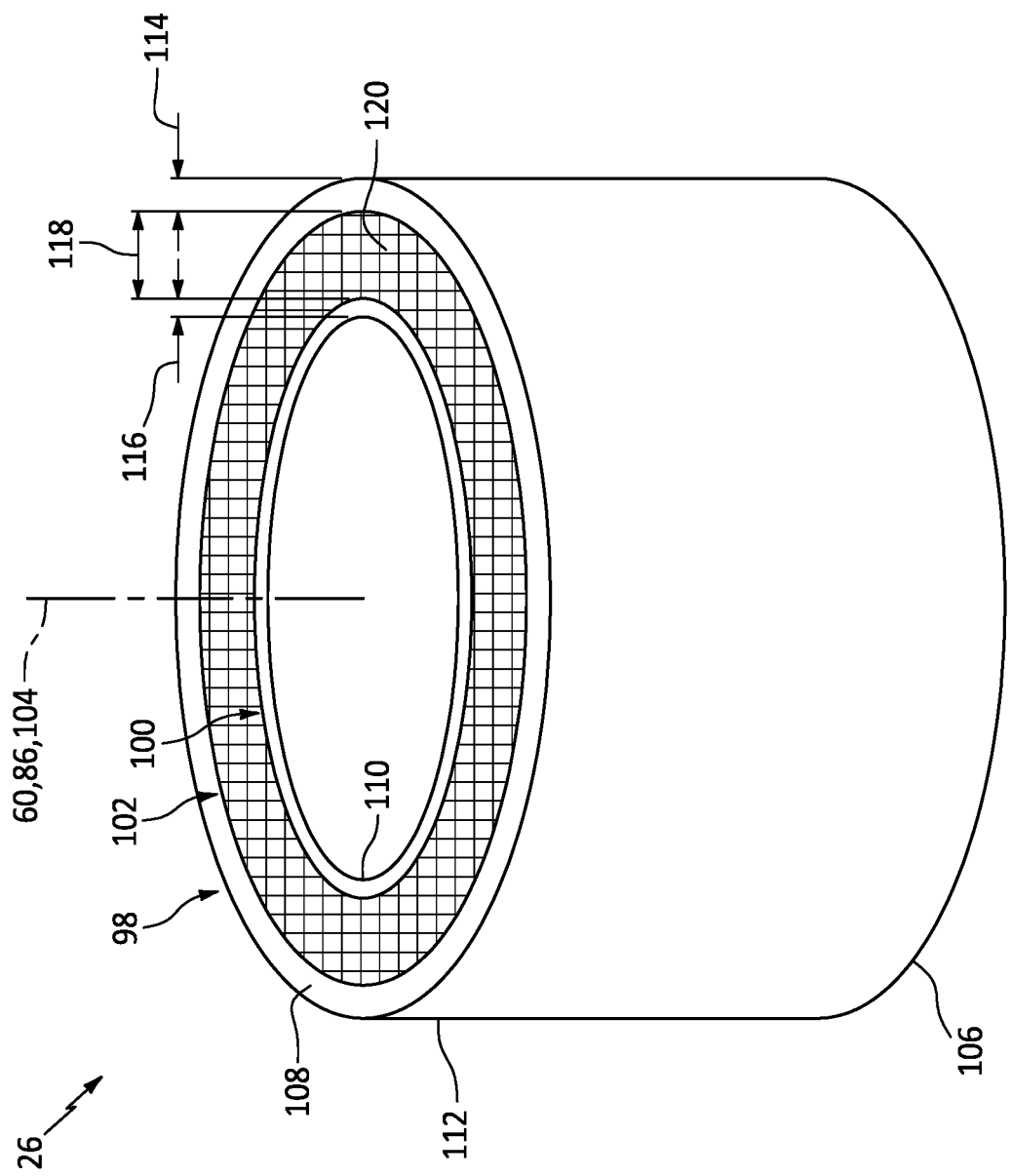
FIG. 4 is a perspective illustration of the conduit bushing.

Referring to FIG. 4, the conduit bushing 26 includes an outer bushing wall 98, an inner bushing wall 100 and a cellular bushing core 102. The conduit bushing 26 and its bushing members 98, 100 and 102 extend circumferentially about a longitudinal centerline 104 of the conduit bushing 26, which longitudinal centerline 104 may be coaxial with the longitudinal centerline 60, 86. The conduit bushing 26 and its bushing members 98, 100 and 102 extend longitudinally along the longitudinal centerline 60, 86, 104 between and to a first (e.g., inner) end 106 of the conduit bushing 26 and a second (e.g., outer) end 108 of the conduit bushing 26. The conduit bushing 26 extends laterally (e.g., radially relative to the longitudinal centerline 60, 86, 104) between and to an inner side 110 of the conduit bushing 26 and an outer side 112 of the conduit bushing 26. The outer bushing wall 98 is disposed at and may form the conduit bushing outer side 112. The inner bushing wall 100 is disposed at and may form the conduit bushing inner side 110. The cellular bushing core 102 extends laterally between and is connected (e.g., bonded, friction fit, etc.) to the outer bushing wall 98 and/or the inner bushing wall 100. With this arrangement, the outer bushing wall 98 circumscribes the cellular bushing core 102 and the inner bushing wall 100. The cellular bushing core 102 circumscribes the inner bushing wall 100.

The outer bushing wall 98 has a lateral thickness 114. The inner bushing wall 100 has a lateral thickness 116. This inner bushing wall thickness 116 may be less than or equal to the outer bushing wall thickness 114. The cellular bushing core 102 has a lateral thickness 118. This cellular bushing core thickness 118 may be greater than the outer bushing wall thickness 114 and/or the inner bushing wall thickness 116. The cellular bushing core thickness 118, for example, may be at least two times (2×), five times (5×) or ten times (10×) the outer bushing wall thickness 114 and/or the inner bushing wall thickness 116; e.g., between one and one-half times (1.5×) and fifteen times (15×) the thickness 114, 116. The present disclosure, however, is not limited to such an exemplary relationship. The thicknesses 114, 116 and 118 of the bushing members 98, 100 and 102, for example, may be selected to tune damping properties of the conduit bushing 26 based on the specific application.

Referring to FIGS. 3A and 3B, the conduit bushing 26 has a cross-sectional geometry when viewed in the reference plane. Referring to FIG. 3A, the conduit bushing geometry may be circular. Alternatively, referring to FIG. 3B, the conduit bushing geometry may be non-circular; e.g., polygonal such as square, rectangular, etc. The conduit bushing geometry may be match with (e.g., the same as) the outer port geometry, the inner port geometry and/or the fluid conduit geometry.

Figure 5:
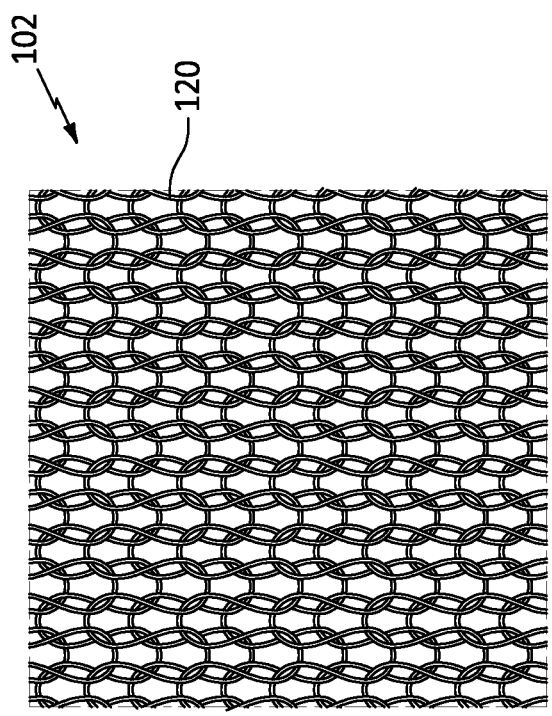
FIG. 5 is an illustration of cellular metal material forming at least a portion of the conduit bushing.

Referring to FIG. 4, the outer bushing wall 98 may be formed as a tubular metal body. This outer bushing wall 98 may be solid (e.g., non-porous) and/or substantially uninterrupted. The inner bushing wall 100 may be formed as another tubular metal body. This inner bushing wall 100 may be solid and/or substantially uninterrupted. The metal forming the inner bushing wall 100 and the metal forming the outer bushing wall 98 may be a common (the same) metal, or may be different metals to provide the bushing sides with different properties. The cellular bushing core 102 may be formed as a tubular body of cellular metal material 120 (e.g., see FIG. 5) such as, but not limited to, metal mesh, metal foam, metal honeycomb mesh or a metal lattice structure (e.g., a cellular metal material formed via additive manufacturing). The cellular metal material 120 of FIG. 5 is an apertured and/or otherwise porous material with a plurality of internal cells; e.g., pores, cavities, channels, through holes, etc. Referring again to FIG. 4, the metal of the cellular metal material 120 and the metal of the bushing wall(s) may be a common metal, or may be different metals to further tailor properties of the conduit bushing 26. Examples of the metal(s) include, but are not limited to, aluminum (Al) or an alloy thereof, titanium (Ti) or an alloy thereof, steel (e.g., stainless steel), nickel (Ni) or an alloy thereof (e.g., a high nickel alloy). The present disclosure, however, is not limited to such an exemplary arrangement or materials. For example, in other embodiments, it is contemplated the cellular bushing core 102 may be formed as a tubular body of (or including) cellular composite material. The cellular composite material may be or otherwise include a ceramic matrix composite, a metal matrix composite or any other composite (e.g., fiber-reinforced composite or non-fiber reinforced composite) capable to withstanding the environmental conditions at the conduit bushing location.

Figure 6:
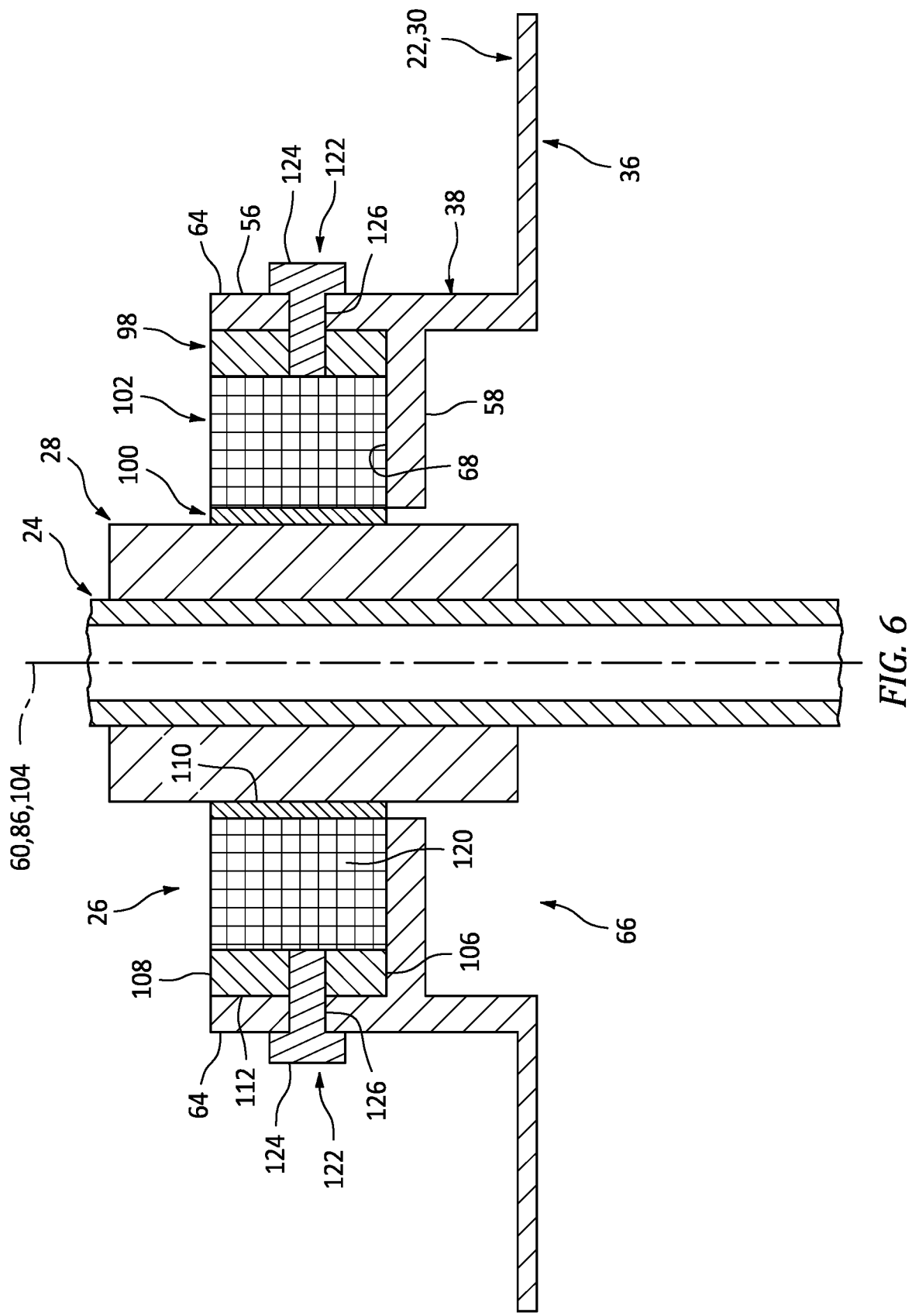
FIG. 6 is an enlarged sectional illustration of a portion of the engine assembly of FIG. 1.

Referring to FIG. 6, the conduit bushing 26 is mounted onto the fluid conduit 24. The conduit bushing 26 of FIG. 6, for example, is mounted onto the conduit sleeve 28 (e.g., a protective layer, another bushing, etc.), and the conduit sleeve 28 is mounted onto the fluid conduit 24. The conduit sleeve 28 may be fixed to the fluid conduit 24 via an interference fit, bonding and/or otherwise. The conduit bushing 26 may be fixed to the conduit sleeve 28 via an interference fit, a threaded connection and/or otherwise. However, it is contemplated the conduit bushing 26 may alternatively be operable to translate (e.g., slightly) longitudinally along and/or rotate slightly about the conduit sleeve 28 in other embodiments.

The conduit bushing 26 is mounted to the conduit boss 38. The conduit bushing 26 of FIG. 6, for example, is seated within the outer port 66 and, more particularly, the outer counterbore, where the conduit bushing 26 may be abutted longitudinally against the boss rim 58 and its outer shelf 68.

The conduit bushing 26 may be fixed to the outer case 30 and its conduit boss 38 via one or more fasteners 122; e.g., bolts, set screws, etc. Each fastener 122 of FIG. 6, for example, includes a head 124 and a shank 126. The head 124 may be abutted against the conduit boss outer side 64. The shank 126 may project out from the head 124, through an aperture in the boss wall 56, and may be abutted against or project into or through the conduit bushing 26 and its outer bushing wall 98. The present disclosure, however, is not limited to such an exemplary attachment technique. The conduit bushing 26, for example, may also or alternatively be fixed to the conduit bushing 26 via an interference fit, bonding and/or otherwise.

During gas turbine engine operation, the fluid conduit 24 may be subject to lateral and/or longitudinal vibrations. The lateral vibrations may describe vibrations which have a tendency to move the fluid conduit 24 laterally side-to-side (e.g., circumferentially about the centerline axis 44; see FIG. 1) and/or laterally back-and-forth (e.g., axially along the centerline axis 44; see FIG. 2). The longitudinal vibrations may describe vibrations which have a tendency to move the fluid conduit 24 longitudinally up-and-down (e.g., longitudinally along the longitudinal centerline 60, 86, 104). The conduit bushing 26, however, may damp some or all of these vibrations. The cellular metal material 120 (e.g., metal mesh) of the conduit bushing 26, for example, may resiliently deform (e.g., compress, extend, twist, etc.) and thereby absorb vibrational energy from the fluid conduit 24. This operability to resiliently deform may also facilitate relative movement between the fluid conduit 24 and the stationary structure 22 and its outer case 30. The conduit bushing 26 and its cellular metal material 120 may thereby accommodate thermally induced movement (e.g., shifting) of the stationary structure 22 relative to the fluid conduit 24. In this manner, the conduit bushing 26 and its cellular metal material 120 may support the fluid conduit 24 while also reducing internal stresses within the fluid conduit 24 as well as reducing or eliminating potential for rubbing between the stationary structure 22 and the fluid conduit 24.

The conduit bushing 26 of FIG. 6 is engaged with and laterally between the conduit boss 38 and the fluid conduit 24. The lateral engagement between the conduit bushing 26 and the fluid conduit 24 may be indirect engagement through, for example, the conduit sleeve 28. However, in other embodiments, it is contemplated the conduit sleeve 28 may be omitted and the conduit bushing 26 may directly engage (e.g., contact) an exterior surface of the fluid conduit 24.

Referring to FIG. 1, the fluid conduit 24 may be included as part of a fluid system 128 for the gas turbine engine. The fluid system 128 of FIG. 1, for example, includes a fluid source 130, a fluid circuit 132 and the engine component 92. The fluid circuit 132 includes an internal bore 134 through the fluid conduit 24. This fluid circuit 132 is configured to direct fluid (e.g., lubricant and/or coolant) from the fluid source 130, through the fluid conduit 24 and its internal bore 134, to at least (or only) the engine component 92.

Figure 7:
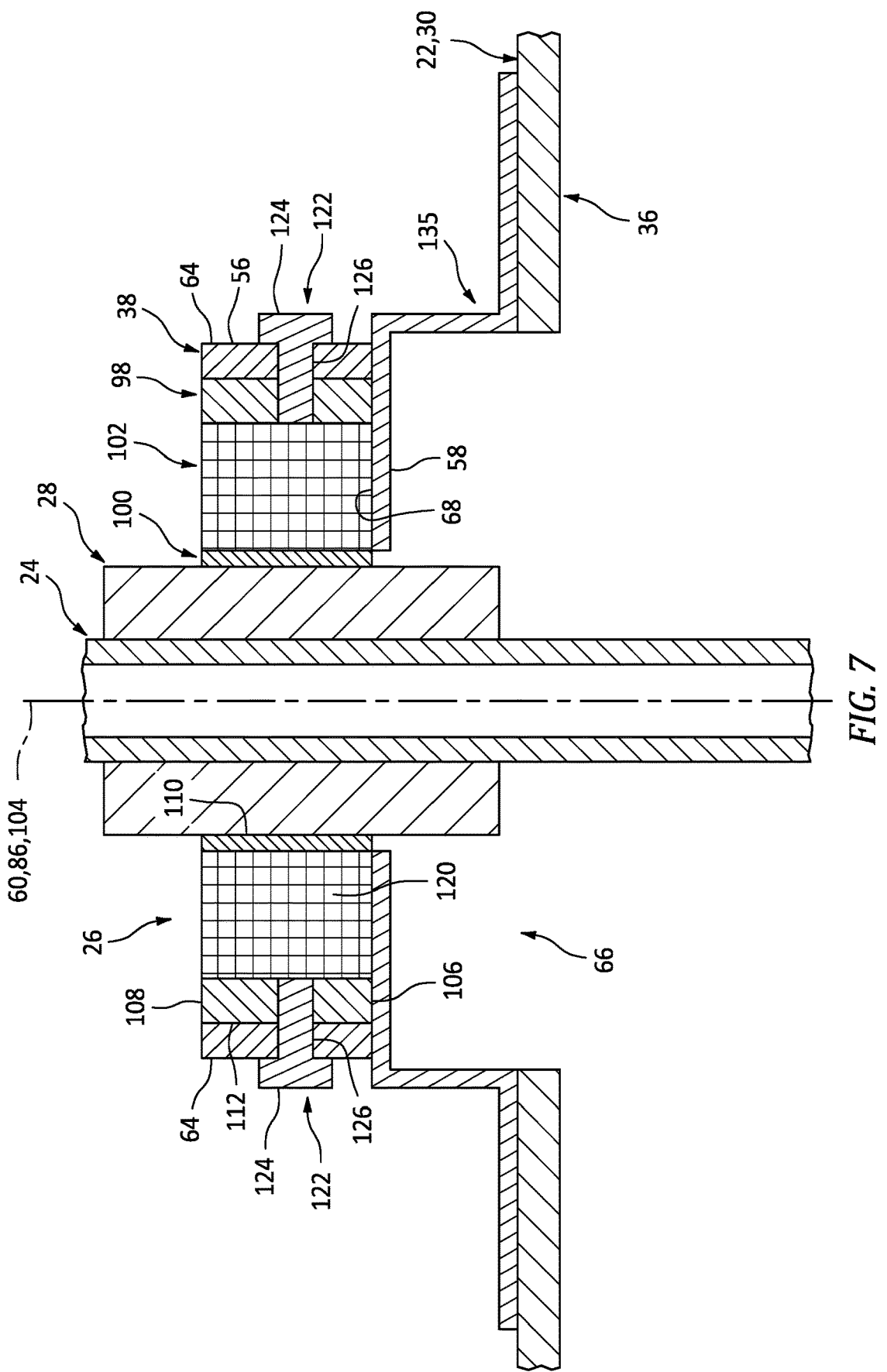
FIG. 7 is an enlarged sectional illustration of a portion of the engine assembly with a bracket attaching the conduit boss to an engine case.

In some embodiments, referring to FIG. 1, the conduit boss 38 may be formed as an integral part of the outer case wall 36. In other embodiments, referring to FIG. 7, the conduit boss 38 may be attached to the outer case wall 36 by a bracket 135; e.g., a channeled bracket. The backet 135 may form the internal boss outer shelf 68. The boss wall 56 may be connected to and project out from the bracket 135.

Figure 8:
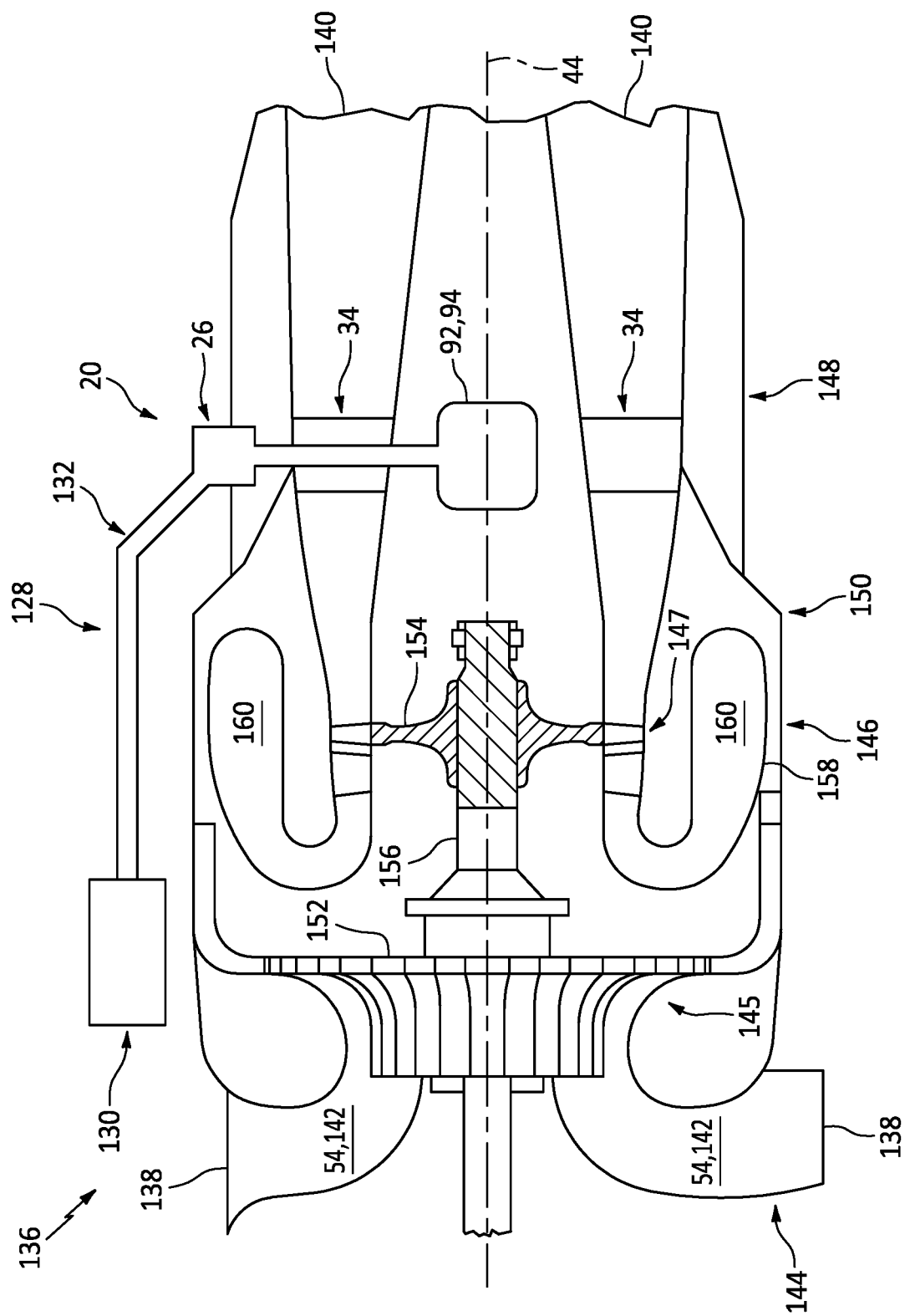
FIG. 8 is a partial schematic side sectional illustration of a gas turbine engine.

FIG. 8 is a partial schematic side sectional illustration of a gas turbine engine 136, which gas turbine engine 136 may include the engine assembly 20 described above. The gas turbine engine 136 of FIG. 8 is configured as a single spool, radial-flow gas turbine engine. This gas turbine engine 136 may be included in an auxiliary power unit (APU) for an aircraft. Alternatively, the gas turbine engine 136 may be included in a propulsion system for the aircraft. Examples of the aircraft include, but are not limited to, an airplane, a drone (e.g., an unmanned aerial vehicle (UAV)), a helicopter or any other manned or unmanned aerial vehicle. The present disclosure, however, is not limited to such an exemplary single spool, radial-flow gas turbine engine nor to aircraft applications. For example, the gas turbine engine 136 may alternatively be configured as an industrial gas turbine engine within a land based power generation system.

The gas turbine engine 136 of FIG. 8 extends axially along the centerline axis 44 from a forward, upstream airflow inlet 138 into the gas turbine engine 136 to an aft, downstream combustion products exhaust 140 from the gas turbine engine 136. The gas turbine engine 136 includes a core flowpath 142 (e.g., the flowpath 54), an inlet section 144, a (e.g., radial flow) compressor section 145, a (e.g., reverse flow) combustor section 146, a (e.g., axial flow) turbine section 147 and an exhaust section 148. The gas turbine engine 136 also includes a housing structure 150 housing and/or at least partially forming one or more or all of the engine sections 144-148.

The core flowpath 142 may extend within the gas turbine engine 136 from the airflow inlet 138 to the combustion products exhaust 140. The core flowpath 142 of FIG. 8, in particular, extends sequentially through the inlet section 144, the compressor section 145, the combustor section 146, the turbine section 147 and the exhaust section 148.

The compressor section 145 includes a bladed compressor rotor 152; e.g., a compressor impeller. The turbine section 147 includes a bladed turbine rotor 154. Each of these engine rotors 152, 154 includes a plurality of rotor blades arranged circumferentially around and connected to at least one respective rotor disk or hub. The rotor blades, for example, may be formed integral with or mechanically fastened, welded, brazed, adhered and/or otherwise attached to the respective rotor disk or hub.

The compressor rotor 152 is connected to the turbine rotor 154 and an engine shaft 156. This engine shaft 156 is rotatably supported by the housing structure 150 through a plurality of bearings; e.g., rolling element bearings, journal bearings, etc. At least the compressor rotor 152, the turbine rotor 154 and the engine shaft 156 may form an engine rotating structure within the gas turbine engine 136.

The combustor section 146 includes an annular combustor 158 with an annular combustion chamber 160. The combustor 158 of FIG. 8 is configured as a reverse flow combustor. Inlets ports/flow tubes into the combustion chamber 160, for example, may be arranged at (e.g., on, adjacent or proximate) and/or towards an aft bulkhead wall of the combustor 158. An outlet from the combustor 158 may be arranged axially aft of an inlet to the turbine section 147. The combustor 158 may also be arranged radially outboard of and/or axially overlap at least a (e.g., aft) portion of the turbine section 147. With this arrangement, the core flowpath 142 of FIG. 8 reverses direction (e.g., from a forward-to-aft direction to an aft-to-forward direction) a first time as the core flowpath 142 extends from a diffuser plenum surrounding the combustor 158 into the combustion chamber 160. The core flowpath 142 of FIG. 8 then reverses direction (e.g., from the aft-to-forward direction to the forward-to-aft direction) a second time as the core flowpath 142 extends from the combustion chamber 160 into the turbine section 147.

During operation, air enters the gas turbine engine 136 through the inlet section 144 and its airflow inlet 138. The inlet section 144 directs the air from the airflow inlet 138 into the core flowpath 142 and the compressor section 145. The air entering the core flowpath 142 may be referred to as core air. This core air is compressed by the compressor rotor 152. The compressed core air is directed through a diffuser and its plenum into the combustion chamber 160. Fuel is injected and mixed with the compressed core air to provide a fuel-air mixture. This fuel-air mixture is ignited within the combustion chamber 160, and combustion products thereof flow through the turbine section 147 and cause the turbine rotor 154 to rotate. The rotation of the turbine rotor 154 drives rotation of the compressor rotor 152 and, thus, compression of the air received from the airflow inlet 138. The exhaust section 148 receives the combustion products from the turbine section 147. The exhaust section 148 directs these combustion products out of the gas turbine engine 136 through the combustion products exhaust 140.

The engine assembly 20 may be included in various gas turbine engines other than the one described above. The engine assembly 20, for example, may be included in a geared gas turbine engine where a gear train connects one or more shafts to one or more rotors in a fan section, a compressor section and/or any other engine section. Alternatively, the engine assembly 20 may be included in a direct drive gas turbine engine configured without a gear train. The engine assembly 20 may be included in a gas turbine engine configured with a single spool, with two spools, or with more than two spools. The present disclosure therefore is not limited to any particular types or configurations of gas turbine engines. It is also contemplated the engine assembly 20 may be included in a gas turbine hybrid electric engine or any turbine hybrid engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
   a gas turbine engine case including a case wall and a boss at a port through the case wall;
   a conduit extending longitudinally along a centerline through the port and into an interior of the gas turbine engine case;
   a bushing circumscribing the conduit and arranged within the port, the bushing engaged with and laterally between the conduit and the boss, and the bushing comprising a cellular material; and
   a sleeve mounted on the conduit, the bushing engaging the conduit through the sleeve.

2. The assembly of claim 1, wherein the bushing is configured to damp longitudinal vibrations of the conduit.

3. The assembly of claim 1, wherein the bushing is configured to damp lateral vibrations of the conduit.

4. The assembly of claim 1, wherein the conduit is configured to move longitudinally relative to the gas turbine engine case.

5. The assembly of claim 1, wherein the conduit is configured to move laterally relative to the gas turbine engine case.

6. The assembly of claim 1, wherein the bushing is configured to support the conduit within the boss.

7. The assembly of claim 1, wherein the bushing is fixed to the conduit.

8. The assembly of claim 1, wherein the bushing is fixed to the boss.

9. The assembly of claim 1, wherein the cellular material comprises at least one of metal mesh or composite mesh.

10. The assembly of claim 1, wherein the cellular material circumscribes the conduit.

11. The assembly of claim 10, wherein the bushing further comprises an outer wall circumscribing and attached to the cellular material.

12. The assembly of claim 1, wherein the bushing is seated longitudinally against a shelf within the port.

13. The assembly of claim 1, wherein
    the case wall extends circumferentially about an axis; and
    the axis is angularly offset from the centerline.

14. The assembly of claim 1, wherein the gas turbine engine case is configured as an exhaust case for the gas turbine engine.

15. An assembly for a gas turbine engine, comprising:
    a gas turbine engine case including a case wall and a boss at a port through the case wall;
    a conduit extending longitudinally along a centerline through the port and into an interior of the gas turbine engine case; and
    a bushing circumscribing the conduit and arranged within the port, the bushing engaged with and laterally between the conduit and the boss, and the bushing comprising a cellular material; wherein the bushing engages the conduit through a threaded connection.

16. An assembly for a gas turbine engine, comprising:
    a gas turbine engine case including a case wall and a boss at a port through the case wall;
    a conduit extending longitudinally along a centerline through the port and into an interior of the gas turbine engine case;
    a bushing circumscribing the conduit and arranged within the port, the bushing engaged with and laterally between the conduit and the boss, and the bushing comprising a cellular material; and
    a fastener extending through the boss and into the bushing;
    the fastener mounting the bushing to the boss.

17. An assembly for a gas turbine engine, comprising:
    a gas turbine engine case including a case wall and a boss at a port through the case wall;
    a conduit extending longitudinally along a centerline through the port and into an interior of the gas turbine engine case; and
    a bushing circumscribing the conduit and arranged within the port, the bushing engaged with and laterally between the conduit and the boss, and the bushing comprising a cellular material;
    wherein the cellular material circumscribes the conduit;
    wherein the bushing further comprises an inner wall circumscribing the conduit; and
    wherein the cellular material further circumscribes and is attached to the inner wall.

* * * * *